(12) United States Patent
Lindström (10) Patent No.: US 11,840,237 B2
(45) Date of Patent: Dec. 12, 2023

(54) CONTROL DEVICE AND METHOD FOR CONTROLLING A VEHICLE POWERTRAIN TO OVERCOME, OR AVOID, A COG-TO-COG CONDITION, COMPUTER PROGRAM, COMPUTER-READABLE MEDIUM AND VEHICLE

(71) Applicant: Scania CV AB, Södertälje (SE)

(72) Inventor: Jonas Lindström, Hägersten (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/610,358

(22) PCT Filed: May 5, 2020

(86) PCT No.: PCT/SE2020/050452
§ 371 (c)(1),
(2) Date: Nov. 10, 2021

(87) PCT Pub. No.: WO2020/236060
PCT Pub. Date: Nov. 26, 2020

(65) Prior Publication Data
US 2022/0227371 A1   Jul. 21, 2022

(30) Foreign Application Priority Data
May 17, 2019   (SE) .................................. 1950587-4

(51) Int. Cl.
*B60W 30/19*   (2012.01)
*F16H 61/04*   (2006.01)

(52) U.S. Cl.
CPC ....... *B60W 30/19* (2013.01); *B60W 2510/081* (2013.01); *B60W 2510/10* (2013.01); *F16H 2061/047* (2013.01); *F16H 2061/0418* (2013.01)

(58) Field of Classification Search
CPC ............ B60W 30/19; B60W 2510/10; B60W 30/18027; F16H 59/44; F16H 2061/0474;
(Continued)

(56) References Cited

U.S. PATENT DOCUMENTS 7,717,246 B2   5/2010   Hiraiwa
8,347,749 B2   1/2013   Guggolz et al.
(Continued)

FOREIGN PATENT DOCUMENTS

CN   101029683 A   9/2007
CN   102263213 A   11/2011
(Continued)

OTHER PUBLICATIONS

Scania CV AB, International Patent Application No. PCT/SE2020/050452, International Search Report, dated Jun. 10, 2020.
(Continued)

*Primary Examiner* — Roger L Pang
(74) *Attorney, Agent, or Firm* — Moore & Van Allen PLLC; W. Kevin Ransom (57) ABSTRACT

A control device and a method for controlling a vehicle powertrain to overcome, or avoid, a cog-to-cog condition during gear shifting is provided. The method comprises, when an input shaft of the gearbox is rotating, controlling a synchromesh arrangement so as to induce a difference in rotational speed between a first gear wheel and a first coupling sleeve arranged to lock the first gear wheel to a main shaft of the gearbox by at least partly engaging the first gear wheel or a second gear wheel to the input shaft. Furthermore, a computer program, a computer-readable medium and a vehicle are provided.

15 Claims, 3 Drawing Sheets

(58) Field of Classification Search
CPC ...... F16H 61/04; F16H 61/70; F16H 61/0403; F16H 2061/047; F16H 2061/0407; F16H 2061/0411; F16H 2061/0414; F16H 2061/0418
USPC .............................................. 701/51; 74/335
See application file for complete search history.

(56) References Cited

U.S. PATENT DOCUMENTS

| | | | |
|---|---|---|---|
| 9,065,111 B2 | 6/2015 | Kim et al. | |
| 9,770,969 B2 | 9/2017 | Bjrkman et al. | |
| 10,086,841 B2 | 10/2018 | Kuzuhara et al. | |
| 2003/0110875 A1 | 6/2003 | Brandt | |
| 2004/0118652 A1 | 6/2004 | Muetzel et al. | |
| 2007/0250237 A1 | 10/2007 | Zak | |
| 2009/0071274 A1* | 3/2009 | Bader | F16H 61/0403 74/335 |
| 2009/0071277 A1 | 3/2009 | Bader et al. | |
| 2010/0285921 A1 | 11/2010 | Miller et al. | |
| 2012/0055752 A1 | 3/2012 | Schneider et al. | |
| 2012/0065848 A1 | 3/2012 | Neuberth et al. | |
| 2013/0296134 A1 | 11/2013 | Petzold et al. | |
| 2015/0152960 A1 | 6/2015 | Haug et al. | |
| 2018/0328486 A1* | 11/2018 | Karpenman | F16H 61/04 |

FOREIGN PATENT DOCUMENTS

| | | |
|---|---|---|
| CN | 105246726 A | 1/2016 |
| CN | 107314107 A | 11/2017 |
| DE | 102011117586 A1 | 5/2013 |
| DE | 102015013160 A1 | 4/2016 |
| EP | 1150042 A2 | 10/2001 |
| EP | 2131065 A2 | 12/2009 |
| EP | 2418402 A2 | 2/2012 |
| EP | 2600038 A2 | 6/2013 |
| SE | 1351379 A1 | 5/2015 |
| WO | 2014120075 A1 | 8/2014 |
| WO | 2015152800 A1 | 10/2015 |

OTHER PUBLICATIONS

Scania CV AB, International Patent Application No. PCT/SE2020/050452, Written Opinion, dated Jun. 10, 2020.
Scania CV AB, Swedish Patent Application No. 1950587-4, Office Action, dated Oct. 28, 2019.
Scania CV AB, Swedish Patent Application No. 1950587-4, Office Action, dated Jun. 10, 2020.
Scania CV AB, Chinese Patent Application No. 202080030202.4, First Office Action, dated Jun. 29, 2022.
Scania CV AB, International Patent Application No. PCT/SE2020/050452, International Preliminary Report on Patentability, dated Nov. 16, 2021.
Scania CV AB, European Patent Application No. 20809644.6, Extended European Search Report, dated Jan. 3, 2023.

* cited by examiner

CONTROL DEVICE AND METHOD FOR CONTROLLING A VEHICLE POWERTRAIN TO OVERCOME, OR AVOID, A COG-TO-COG CONDITION, COMPUTER PROGRAM, COMPUTER-READABLE MEDIUM AND VEHICLE

CROSS-REFERENCE TO RELATED APPLICATIONS

This application is a National Stage patent application (filed under 35 § U.S.C. 371) of PCT/SE2020/050452, filed May 5, 2020 of the same title, which, in turn claims priority to Swedish Patent Application No. 1950587-4 filed May 17, 2019 of the same title; the contents of each of which are hereby incorporated by reference.

FIELD OF THE INVENTION

The present disclosure relates in general to a method for controlling a vehicle powertrain and a control device configured to control a vehicle powertrain. The present disclosure further relates in general to a computer program and a computer-readable medium. Moreover, the present disclosure relates in general to a vehicle.

BACKGROUND OF THE INVENTION

Vehicles are driven forward by a propulsion unit torque produced by a propulsion unit, such as a combustion engine, in the vehicle. This propulsion unit torque is transmitted to the driving wheels of the vehicle through a powertrain of the vehicle. In addition to the propulsion unit, the powertrain comprises a gearbox adapted to selectively transfer torque between the propulsion unit and the driving wheels, at different gear ratios.

When shifting gears in a gearbox, cogwheels are often engaged and locked on shafts by means of axially displaceable coupling sleeves. Such a coupling sleeve generally comprises cogs, which are configured to mesh with corresponding spaces between cogs of the gear cogwheel to be engaged on the shaft. In order to engage the coupling sleeve with the cogwheel, the coupling sleeve and the cogwheel therefore need to have the same rotational speed.

A situation that may be encountered when seeking to engage an unsynchronized gear during a gear shifting step is that the cogs of the coupling sleeve and the cogs of the gear cogwheel end up in a cog-to-cog state, instead of intermeshing as intended. The time spent in this state is dependent of difference in angular velocity between the coupling sleeve and the cogwheel to be engaged. A lower difference in angular velocity increase the time spent in this state. This problem is especially pronounced when seeking to engage a start gear for starting propulsion of the vehicle, since in this situation the difference in angular velocity may be zero for a long time in view of the vehicle being at standstill. This can in turn lead to infinity long engagement time if no action is taken.

In addition to the fact that a slow gear shift may influence the operation of the vehicle, a slow gear shift performance may also cause irritation and thereby discomfort for a driver of the vehicle.

It has previously been proposed to use the clutch of the powertrain to overcome the problem. For example, US 2004/0118652 A1 discloses a strategy for overcoming a tooth butt condition wherein a controller selectively closes the clutch to provide limited engagement between the engine and the transmission in case a tooth butt condition exists. If the tooth butt condition is not resolved, the controller then changes the target closed clutch position to provide a different level of engagement between the engine and the transmission. The process is repeated until the tooth butt condition is resolved.

SUMMARY OF THE INVENTION

The object of the present invention is to provide fast and comfortable gear shifts during shift of an unsynchronized main gear.

The object is achieved by the subject-matter of the appended independent claims.

In accordance with the present disclosure, a method for controlling a vehicle powertrain to overcome, or avoid, a cog-to-cog condition during gear shifting is provided. The vehicle powertrain comprises a propulsion unit and a gearbox. The gearbox comprises an input shaft, a lay shaft connected to the input shaft, and a main shaft connected to the lay shaft. The gearbox further comprises a first gear wheel configured to be engaged to the main shaft by a first coupling sleeve, the first coupling being axially movable and rotatably fixed to the main shaft. The gearbox further comprises a synchromesh arrangement comprising a second coupling sleeve. The synchromesh arrangement is configured to engage the first gear wheel and/or a second gear wheel to the input shaft. The method comprises a step of, when the input shaft is rotating, controlling the synchromesh arrangement so as to induce and/or increase a difference in rotational speed between the first gear wheel and the first coupling sleeve by at least partly engaging the first gear wheel or the second gear wheel to the input shaft. The method is performed by a control device.

A difference in rotational speed between the first gear wheel and the first coupling sleeve increases the probability for proper engagement of the respective cogs of the first gear wheel and the first coupling sleeve. An increase of the difference in the rotational speed between the first gear wheel and the first coupling sleeve may further improve the probability for proper engagement. The difference in rotational speed may be increased up to a threshold value at which the probability for proper engagement is reduced again, for example due to the coupling sleeve risking bouncing against the cogs of the first gear wheel (a situation which also may be called gear grinding).

In view of the fact that the method according to the present disclosure overcomes or avoids a cog-to-cog condition, fast and accurate gear shifts may be achieved. Fast and accurate gear shifts also contributes to the comfort for the driver and potential passengers of the vehicle.

Furthermore, by means of the method according to the present disclosure, usage of the clutch (for example by engaging/disengaging the clutch a plurality of times) to overcome a cog-to-cog condition can be minimized, or even avoided. Thus, the wear of the clutch may be minimized by means of the present method.

The method may further comprise controlling the rotational speed of the input shaft to achieve a desired amount of difference in rotational speed between the first gear wheel and the first coupling sleeve. Thereby, a prevailing cog-to-cog condition may be quickly solved or, if not already present, be efficiently avoided.

The method may comprise controlling an actuator of the synchromesh arrangement so as to achieve a desired frictional force between constituent components in the synchromesh arrangement, thereby in turn obtaining a desired amount of difference in rotational speed between the first gear wheel and the first coupling sleeve. Thereby, a prevailing cog-to-cog condition may be quickly solved or, if not already present, be efficiently avoided.

Although the method according to the present disclosure may be used in conjunction of any gear shift of an unsynchronized main gear, the method is particularly suitable when engaging a starting gear. In such a condition, there is a high probability for a cog-to-cog condition to occur between the first gear wheel and the first coupling sleeve. Furthermore, since the main shaft of the gearbox in such a case is in a non-rotating state, the cog-to-cog situation may be difficult to solve without taking an active measure, such as achieved by the present method. Thus, according to one aspect, the main shaft may be in a non-rotating state at the initiation of the method.

The method may be performed in order to overcome a prevailing cog-to-cog condition of the first gear wheel and the first coupling sleeve during gear shifting. Thus, the method may further comprise an initial step of detecting a cog-to-cog condition between the first gear wheel and the first coupling sleeve. After the detection of the presence of the cog-to-cog condition, the synchromesh arrangement may be controlled so as to induce and/or increase the difference in rotational speed between the first gear wheel and the first coupling sleeve as described above.

The present disclosure further relates to a computer program comprising instructions, which when executed by a control device, cause the control device to perform the method for controlling a vehicle powertrain to overcome, or avoid, a cog-to-cog condition during gear shifting as described above.

The present disclosure further relates to a computer-readable medium comprising instructions, which when executed by a control device, cause the control device to perform the method for controlling a vehicle powertrain to overcome, or avoid, a cog-to-cog condition during gear shifting as described above.

Moreover, a control device configured to control a vehicle powertrain to overcome, or avoid a cog-to-cog condition during gear shifting is provided. The vehicle powertrain comprises a propulsion unit and a gearbox. The gearbox comprises an input shaft, a lay shaft connected to the input shaft, and a main shaft connected to the lay shaft. The gearbox further comprises a first gear wheel configured to be engaged to the main shaft by a first coupling sleeve, the first coupling being axially movable and rotatably fixed to the main shaft. The gearbox further comprises a synchromesh arrangement comprising a second coupling sleeve. The synchromesh arrangement is configured to engage the first gear wheel and/or a second gear wheel to the input shaft. The control device is configured to, when the input shaft is rotating, control the synchromesh arrangement so as to induce and/or increase a difference in rotational speed between the first gear wheel and the first coupling sleeve by at least partly engaging the first gear wheel or the second gear wheel to the input shaft.

The control device has the same advantages as described above with regard to the corresponding method for controlling a vehicle powertrain to overcome, or avoid, a cog-to-cog condition during gear shifting.

The control device may further be configured to control the rotational speed of the input shaft to achieve a desired amount of difference in rotational speed between the first gear wheel and the first coupling sleeve.

The control device may further be configured to control an actuator of the synchromesh arrangement in order to achieve a desired frictional force in the synchromesh arrangement, thereby in turn achieving a desired amount of difference in rotational speed between the first gear wheel and the first coupling sleeve.

The control device may also be configured to determine a cog-to-cog condition between the first gear wheel and the first coupling sleeve, and to perform the step of controlling the synchromesh arrangement so as to induce and/or increase a difference in rotational speed between the first gear wheel and the first coupling sleeve if a cog-to-cog condition has been determined.

Moreover, the present disclosure also relates to a vehicle comprising a propulsion unit and a gearbox. The vehicle further comprises a control device configured to control a vehicle powertrain to overcome, or avoid a cog-to-cog condition during gear shifting as described above.

DETAILED DESCRIPTION OF THE INVENTION

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

In accordance with the present disclosure, a method for controlling a vehicle powertrain is provided. The vehicle powertrain comprises a propulsion unit, such as a combustion engine, and a gearbox. The gearbox comprises an input shaft, a lay shaft connected to the input shaft, and a main shaft connected to the lay shaft. The gearbox further comprises a first gear wheel configured to be engaged to the main shaft by a first coupling sleeve. The first gear wheel is unsynchronized in relation to the main shaft. In other words, there is no separate arrangement, associated with the first gear wheel, which is configured to synchronize the first gear wheel and the main shaft. The first coupling sleeve is axially movable and rotatably fixed to the main shaft. The gearbox further comprises a synchromesh arrangement comprising a second coupling sleeve. The second coupling sleeve may optionally be a split sleeve. The synchromesh arrangement is configured to engage the first gear wheel and/or a second gear wheel to the input shaft. The method is performed by a control device configured to perform the method. The method comprises a step of, when the input shaft is rotating, controlling the synchromesh arrangement so as to induce and/or increase a difference in rotational speed between the first gear wheel and the first coupling sleeve by at least partially engaging the first gear wheel or the second gear wheel to the input shaft.

Due to the at least partial engagement of the first gear wheel or the second gear wheel to the input shaft, at least a part of the rotational movement of the input shaft will be transferred to the first or second gear wheel being at least partially engaged. Thereby, there will be a change of the difference in rotational speed between the first gear wheel and the first coupling sleeve. This difference in rotational speed between the first gear wheel and the first coupling sleeve avoids, or overcomes, a cog-to-cog condition between the first gear wheel and the first coupling sleeve.

If the input shaft is not already rotating, the method may comprise controlling the powertrain so as to initiate rotation of the input shaft of the gearbox. This may for example be performed by controlling the propulsion unit, which may be a combustion engine, so as to initiate the rotational movement of the input shaft of the gearbox. In case the powertrain comprises a clutch arranged between the propulsion unit and the gearbox, the clutch may be controlled to be in a fully engaged or partly engaged state for this purpose. Rotation of the input shaft of the gearbox may alternatively be induced by means of an electrical machine, if such an electrical machine is present in the vehicle powertrain.

The method may be performed in order to overcome a cog-to-cog condition during gear shifting. Such a cog-to-cog condition may for example be detected or otherwise identified by a control device configured to control the vehicle powertrain. Thus, the method may for example be initiated upon detection of a prevailing cog-to-cog condition. Alternatively, the method may be performed in order to avoid a cog-to-cog condition during gear shifting. In such a case, the method may be performed without an actual detection of a prevailing cog-to-cog condition, but in a situation where there is a risk for a cog-to-cog condition to occur which may not be automatically solved sufficiently fast to avoid disturbance in the operation of the vehicle. In particular, the method may be performed in conjunction with engagement of a starting gear when the vehicle is at standstill since in such a situation, the risk for a cog-to-cog condition which cannot be solved other than by taking an active measure may occur. In such a case, the method may for example be initiated upon a request for engagement of a starting gear. The method is however not limited to a situation where a starting gear should be engaged, but could also be performed in conjunction with other gear shifts.

The fact that a difference in rotational speed between the first gear wheel and the first coupling sleeve is induced and/or increased facilitates the engagement of the first coupling sleeve and the first gear wheel. More specifically, an increase in the difference between the rotational speed of the first gear wheel and the rotational speed of the first coupling sleeve enables the respective cogs to intermesh such that the first gear wheel and the first coupling sleeve become engaged.

The method according to the present disclosure thus utilizes the synchromesh arrangement in the gearbox in contrast to previously known method where the clutch, arranged between the propulsion unit and the gearbox, is relied upon to solve the problem. This has the advantage of reducing the wear of the clutch which may otherwise occur as a result of multiple engagement/disengagement cycles of the clutch as proposed in previously discussed US 2004/0118652 A1. It should however be noted that the present method may in exceptional cases be supplemented with a step of using the clutch after having induced and/or increased the rotational speed between the first gear wheel and the first coupling sleeve, if desired.

The present method for controlling a powertrain also has the advantage of improving the accuracy when used in conjunction with engaging a starting gear. The reason for this is that speed sensors in a vehicle powertrain are normally designed to measure relative high rotational speeds. Therefore, when engaging a starting gear, there will normally be little or no information received from the sensor that is measuring rotational speed of the different shafts in the gearbox. By using the herein disclosed method, the input shaft can have a higher rotational speed to engage the main gear in case of cog-to-cog conditions or risk therefore. This possibility of a higher rotational speed of the input shaft is due to the gear ratios as well as gliding of the frictional surfaces in the synchromesh arrangement when engaging a split gear. The higher rotational speed of the input shaft increases the accuracy of the reading of a sensor configured to measure the rotational speed thereof, thereby better accuracy in the control of the powertrain may be achieved. This will lead to faster, more comfortable, and more accurate engagements of the starting gear as well as less mechanical wear of components in the gearbox. The rotational speed of the input shaft may be controlled by means of any previously known method therefore, for example by means of an electrical motor, a transmission brake associated with the input shaft or lay shaft of the gearbox, or by partial engagement of the clutch.

When the synchromesh arrangement has been controlled so as to induce and/or increase the difference in rotational speed between the first gear wheel and the first coupling sleeve by at least partly engaging the first gear wheel or the second gear wheel to the input shaft, the method may comprise a step of controlling the rotational speed of the input shaft to achieve a desired amount of difference in rotational speed between the first gear wheel and the first coupling sleeve. The desired amount of rotational difference may for example be a predetermined amount of rotational difference. Alternatively, the desired amount of rotational difference may be determined by progressively controlling the rotational speed of the input shaft and determining when the cog-to-cog condition has been overcome, i.e. when the first gear wheel and the first coupling sleeve are engaged.

Alternatively, the method may comprise a step of controlling an actuator of the synchromesh arrangement to achieve a desired frictional force in the synchromesh arrangement, thereby in turn obtaining the desired amount of difference in rotational speed between the first gear wheel and the first coupling sleeve.

As mentioned above, the method may be performed when the vehicle is at standstill. In such a situation, the main shaft is in a non-rotating state at the initiation of the method.

The present disclosure further relates to a control device configured to control a vehicle powertrain to overcome, or avoid, a cog-to-cog condition during gear shifting. The control device is configured to control at least the gearbox of the vehicle powertrain. The vehicle powertrain comprises a propulsion unit, such as a combustion engine, and a gearbox. The gearbox comprises an input shaft, a lay shaft connected to the input shaft, and a main shaft connected to the lay shaft. The gearbox further comprises a first gear wheel configured to be engaged to the main shaft by a first coupling sleeve. The first coupling sleeve is axially movable and rotatably fixed to the main shaft. The gearbox further comprises a synchromesh arrangement comprising a second coupling sleeve. The synchromesh arrangement is configured to engage the first gear wheel and/or a second gear wheel to the input shaft. The control device is configured to, when the input shaft is rotating, control the synchromesh arrangement so as to induce and/or increase a difference in rotational speed between the first gear wheel and the first coupling sleeve by at least partly engaging the first gear wheel or the second gear wheel to the input shaft. The control device may further be configured to perform any one of the steps described above with reference to the corresponding method for controlling a vehicle powertrain to overcome, or avoid, a cog-to-cog condition.

Figure 1:
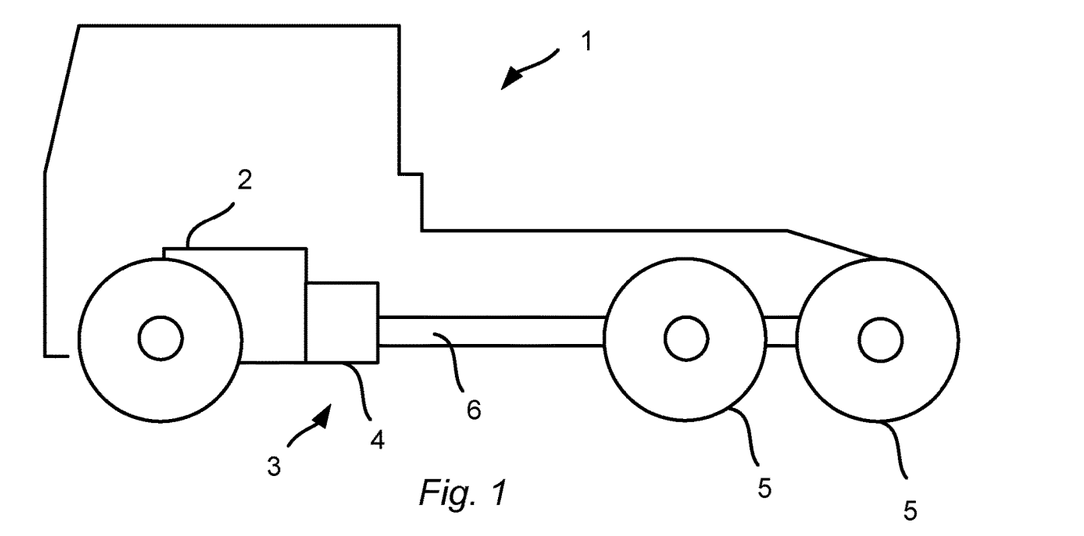
FIG. 1 schematically illustrates a side view of a vehicle.

FIG. 1 schematically illustrates a side view of an example of a vehicle 1. The vehicle 1 comprises a powertrain 3 comprising an internal combustion engine 2 and a gearbox 4. A clutch (shown in FIG. 2) may be arranged between the internal combustion engine 2 and the gearbox 4. The gearbox 4 is connected to the driving wheels 5 of the vehicle 1 via an output shaft 6 of the gearbox 4. The gearbox 4 is adapted to selectively transfer torque between the combustion engine 2 and the driving wheels 5 during operation of the vehicle.

The vehicle 1 may be, but is not limited to, a heavy vehicle, e.g. a truck or a bus. Furthermore, the vehicle may be a hybrid vehicle comprising an electric machine (not shown) in addition to the internal combustion engine 2.

Figure 2:
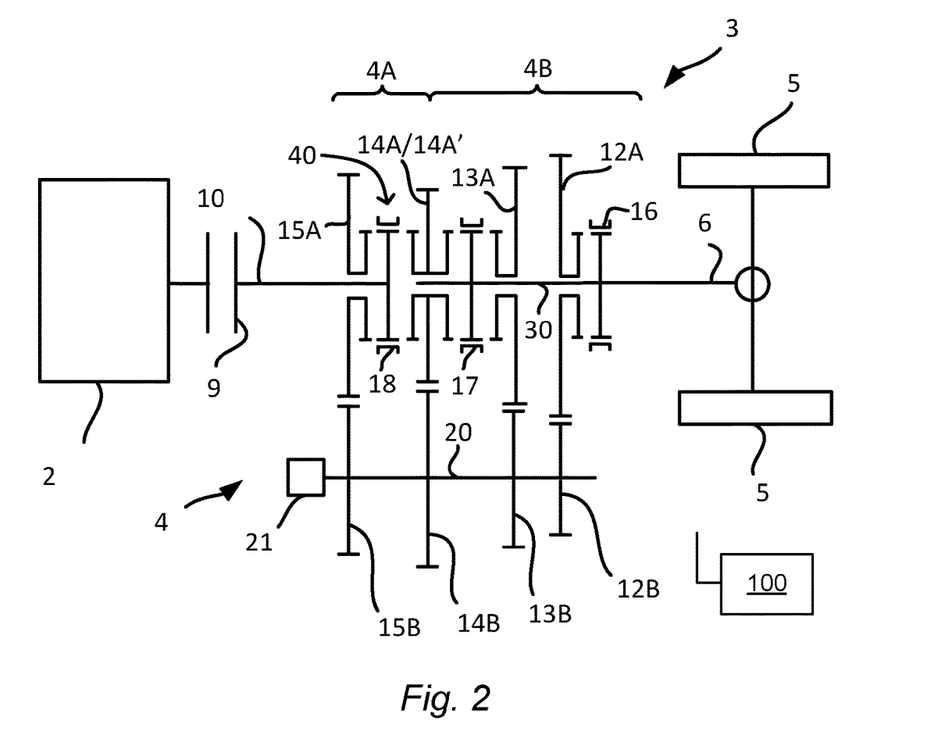
FIG. 2 schematically illustrates an example of a powertrain.

FIG. 2 schematically illustrates an exemplifying embodiment of a vehicle powertrain 3, such as a powertrain of the vehicle 1 shown in FIG. 1. The powertrain 3 comprises a propulsion unit in the form of a combustion engine 2. The powertrain 3 further comprises a gearbox 4 and a clutch 9 arranged between the combustion engine 2 and the gearbox 4. The gearbox 4 may be an automated manual gearbox (AMT). The clutch 9 may be a friction clutch. The vehicle powertrain 3 furthermore comprises a control device 100, as will be described in more detail below. The control device 100 is configured to control at least a part of the powertrain. More specifically, the control device may be configured to control the gearbox 4.

The gearbox 4 comprises an input shaft 10 connected to the clutch 9 and an output shaft 6 connected to the driving wheels 5. The gearbox 4 comprises a first gearbox unit 4A and a second gearbox unit 4B arranged downstream of the first gearbox unit 4A. The first gearbox unit 4A may be a split gearbox unit. The second gearbox unit 4B may constitute a conventional main gearbox that can be set to a number of different forward gear ratios. The second gearbox unit 4B is connectable to the first gearbox unit 4A. Furthermore, while not shown in FIG. 2, the gearbox may optionally comprise additional gearbox units as known in the art, for example a range gearbox arranged downstream of the second gearbox unit.

The second gearbox unit 4B comprises a lay shaft 20 with a plurality of gear wheels 12B, 13B, 14B, 15B that are rotatably fixed to the lay shaft 20. For example, gear wheel 12B may represent a first gear, gear wheel 13B may represent a second gear, and gear wheel 14B may represent a third gear. The second gearbox 4B also comprises a main shaft 30 with corresponding gear wheels 12A, 13A, 14A/14A' which rotate freely in relation to the main shaft 30, but which can be selectively locked for rotation with the main shaft 30 in order to engage a gear. When each of the gear wheels 12A, 13A, 14A/14A' rotate freely in relation to the main shaft 30, the second gearbox unit 4B is in neutral. Thereby, no torque is transmitted from the combustion engine 2 to the driving wheels 5. The gear wheels 12A, 13A, 14A/14A' on the main shaft 30 may be locked by means of corresponding coupling sleeves 16, 17, 18. For example, the first gear in the second gearbox 4B can be engaged by maneuvering the first sleeve 16, arranged to rotate with the main shaft 30, to a position where the gear wheel 12A is engaged, i.e. to the left in the figure. The gear wheel 12A will thereby rotate with the main shaft 30, and the lay shaft 20 will thereby be connected to the main shaft 30 via gear wheel 12B. Each pair of gear wheels on the lay shaft 20 and main shaft 30 represents a gear ratio. The second gear in the second gearbox unit 4B may be engaged by disengaging the first sleeve 16 from the gear wheel 12A and instead moving a second sleeve 17 to a position to the right in the figure where, instead, gear wheel 13A is engaged. The gear wheel 13A is thereby brought into rotation with the main shaft 30. Correspondingly, the third gear in the second gearbox unit 4B may be engaged by maneuvering the second sleeve 17 to the left in the figure where, instead, gear wheel 14A/14A' is engaged. Each of the first through third gears in the second gearbox unit 4B is used for a plurality of the total number of gears provided by the gearbox 4 as a whole. The second gearbox unit 4B may further comprise one or more reverse gears (not shown) and a crawler gear (not shown).

In the method according to the present disclosure, any one of gear wheels 12A, 13A, and 14A may constitute the herein denominated "first gear wheel".

The lay shaft 20 further comprises an additional gear wheel 15B that, similar to the above, is rotatably fixed to the lay shaft 20. The first gearbox unit 4A comprises a corresponding gear wheel 15A rotating freely in relation to the input shaft 10, but which may be selectively locked for rotation with the input shaft 10 through a split sleeve 18. When the split sleeve 18 locks the gear wheel 15A with the input shaft 10, torque can be transferred to the lay shaft 20 via the corresponding gear wheel 15B on the lay shaft 20. The split sleeve 18 can further be used to connect the input shaft 10 to the gear wheel 14A/14A' of the second gearbox unit 4B directly. This way, depending on whether the gear wheel 14A/14A' on the main shaft 30 is rotating freely in relation to the main shaft 30 or if it is locked on the main shaft 30, torque can be transferred to the lay shaft 20 via the corresponding gear wheel 14B on the lay shaft 20 or torque can be transferred from the input shaft 10 directly to the main shaft 30. The gear wheel pair 15A/15B and the split sleeve 18 can thereby be used to provide two different split gear ratios for each gear of the second gearbox unit 4B. The first gearbox unit 4A may thus be controlled to engage a high-split gear or a low-split gear. For example, engaging the low-split gear may comprise to connect the input shaft 10 with the low gear wheel 14A/14A' on the main shaft 30 by means of the split sleeve 18. When e.g. the first gear is engaged in the second gearbox unit 4B, the split sleeve 18 may be arranged to engage gear wheel 14A/14A'. This way, the input shaft 10 is directly connected to gear wheel 14B, which via gear 14B establishes a first gear ratio between the input shaft 10 and the lay shaft 20. The gear wheel 14A/14A', however, is not locked to the main shaft 20, but the lay shaft 20 may be connected to the main shaft 20 through gear wheel pair 12A/12B. To engage the second gear, gear wheel pair 15A/15B is instead engaged, resulting in a second gear ratio between the input shaft and the lay shaft 20. The gear wheel 12A is still engaged by the coupling sleeve 16 according to the above, thereby extending the range of each gear. This split can be performed for each gear of the second gearbox unit 4B.

Each of the coupling sleeves 16, 17, 18 described above may for example be operated by pneumatic actuators (not shown). Furthermore, the clutch 9 may be operated by a pneumatic actuator (not shown).

The second gearbox unit 4B comprises unsynchronized gears. Thus, for the purpose of enabling a gear shift, it is important that the rotational speeds of the shaft and the gear wheel to be engaged are essentially the same. To achieve this, the gearbox 4 may for example comprise one or more transmission brakes, each transmission brake being connected to and configured to brake a corresponding shaft of the gearbox in order to control the rotational speed of such a shaft. In the figure, one example of a transmission brake is shown in the form of a lay shaft transmission brake 21.

The first gearbox unit comprises a synchromesh arrangement comprising the coupling sleeve 18. A synchromesh arrangement in a powertrain of a vehicle is in general used to synchronize the rotational speed between transmission elements, such as a gear wheel and a shaft, before the gear wheel is locked on the shaft. The synchromesh arrangement comprises an axially displaceable coupling sleeve, a latch cone ring and an inner cone ring arranged on the side of the gear wheel associated with the synchromesh arrangement.

As mentioned above, the vehicle powertrain 3 further comprises a control device 100. The control device 100 may be configured to control one or more of the constituent components of the vehicle powertrain 3. The control device may be configured to control at least the gearbox 4. The control device 100 may comprise one or more control units. The responsibility for a specific function or control may be divided between two or more of the control units. One or more of the control units may be implemented in the form of a computer. The control device 100 may for example be connected to the power unit 2 and the gearbox 4. The control device 100 may also be connected to any other constituent component of the vehicle powertrain 3, for example the clutch 9. The connections of the control device 100 to any constituent component of the vehicle powertrain 3 may be in the form of physical connection(s) and/or wireless connection(s).

The control of constituent components in the vehicle powertrain 3 may be governed by programmed instructions. These programmed instructions typically take the forms of a computer program which, when executed in a computer or control unit, causes the computer or control unit to effect desired forms of control action, for example the steps of the method disclosed herein. As described above, such a computer or control unit may be or constitute a part of the control device 100.

Figure 3:
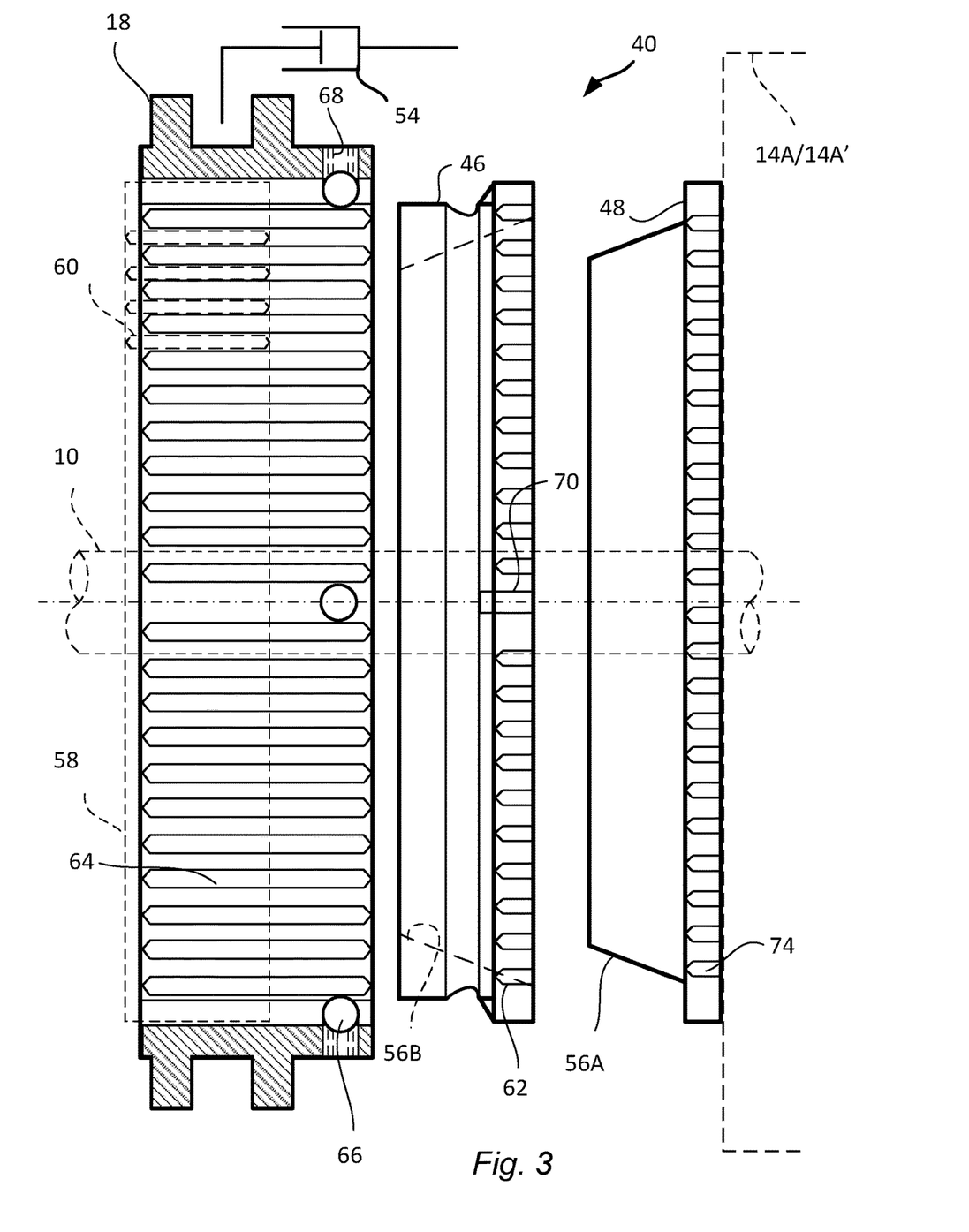
FIG. 3 schematically illustrates a sectional view of an exemplifying synchromesh arrangement.

FIG. 3 schematically illustrates a sectional view of an exemplifying synchromesh arrangement 40, which may be comprised in the gearbox 4 of the powertrain 3 illustrated in FIG. 2. In the following, the synchromesh arrangement will be described in conjunction with the gear wheel 14A/14A" and the input shaft 10. It shall however be recognized that a synchromesh arrangement, such as the one described below, may be arranged at another position in the gearbox.

The synchromesh arrangement 40 comprises a latch cone ring 46 and an inner cone ring 48 arranged on a first side of a first transmission element, such as a gear wheel 14A/14A". The synchromesh arrangement 40 further comprises a coupling sleeve, such as coupling sleeve 18. In FIG. 3 the coupling sleeve 18, latch cone ring 46 and the inner cone ring 48 are depicted on a distance to each other for clarity reason.

The coupling sleeve 18 is axially displaceable by means of an actuator 54. The latch cone ring 46 and the inner cone ring 48 are provided with interacting friction surfaces 56A/56B, which may be of a conical design. The actuator 54 is configured to transmit an axial force to the latch cone ring 46 via the coupling sleeve 18 in order to bring about contact between the friction surfaces 56A/56B on the latch cone ring 46 and the inner cone ring 48, respectively, during gear shifting. This means that a film of lubricant formed between the friction surfaces 56A/56B is displaced and an initial torque between latch cone ring 46 and the inner cone ring 48 builds up.

The first transmission element, i.e. the gear wheel 14A/14A", may be engaged and locked on a second transmission element, such as input shaft 10, with the utilization of the axially displaceable coupling sleeve 18. A hub 58 provided with splines 60 on the periphery is attached to the input shaft 10 and is configured to allow the coupling sleeve 18 to move axially. The hub 58 transmits torque between the input shaft 10 and the coupling sleeve 18. However, the coupling sleeve 18 and gear wheel 14A/14A" may have different rotational speeds during a gear shift when the gear wheel 14A/14A" should be locked on the input shaft 10 by means of the coupling sleeve 18. The normal purpose of the synchromesh arrangement 40, when arranged as described here, is to synchronize the rotational speed between the sleeve 18 and the gear wheel 14A/14A" before the gear wheel 14A/14A" is locked on the shaft 10. If the synchromesh arrangement is arranged at another position in the gearbox, the purpose would be to synchronize the respective transmission elements where it is arranged.

The latch cone ring 46 comprises latch teeth 62. The surface of the latch teeth are designed to engage internal teeth 64 of the coupling sleeve 18 during synchronization. In order to obtain good synchronization properties, the surface of the latch teeth 62 are suitably angled relative to the axis of rotation of the latch cone ring 46. The inner cone ring 48 comprises external teeth 74. The internal teeth 64 of the coupling sleeve 18 are configured to engage with the external teeth 74 at the end of a synchronization process.

A number of balls 66, each loaded with a spring 68, may optionally be arranged in the coupling sleeve 18. The purpose of such balls is to enable a so called pre-synchronization. The spring-loaded balls 66 may act on abutment means 70 arranged on the latch cone ring 46 to ensure that the latch teeth 62 of the latch cone ring 46 are in the correct axial position relative to the internal teeth 64 of the coupling sleeve 18 during pre-synchronization and the abutment means 70 press the spring-loaded balls 66 radially outwards when the coupling sleeve 18 moves axially in relation to the latch cone ring 46 when the pre-synchronization has ended and when the synchronization or main synchronization should start. The latch teeth 62 may extend in a direction parallel to the center line of the latch cone ring 46 and in a peripheral direction. The abutment means 70 may extend in a direction parallel to the center line of the latch cone ring 46 and in a peripheral direction. The abutment means 70 may have a larger extension than the latch teeth 62 in the direction parallel to the center line.

The synchromesh arrangement of the vehicle powertrain 3 is not limited to the synchromesh arrangement 40 described with reference to FIG. 3. Any previously known synchromesh arrangement may be used.

Figure 4:
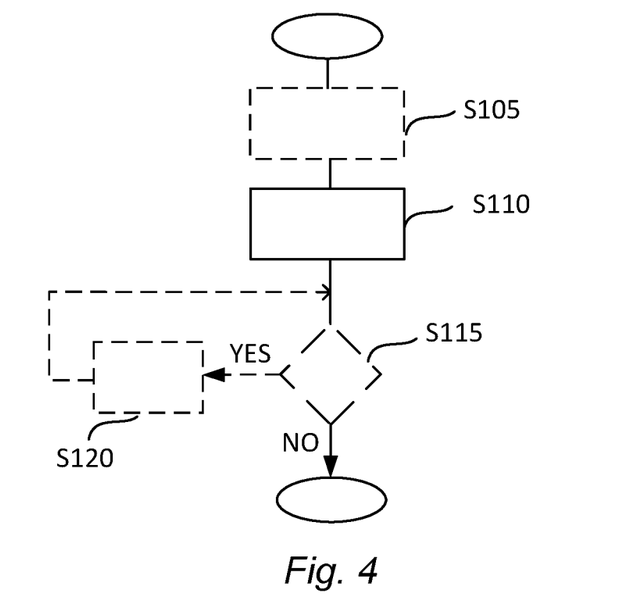
FIG. 4 represents a flowchart schematically illustrating an exemplifying embodiment of a method of controlling a vehicle powertrain.

FIG. 4 represents a flowchart schematically illustrating a method for controlling a vehicle powertrain in accordance with one exemplifying embodiment of the present disclosure. The method may comprise a first step, S105, of detecting that at least one criterion associated with a cog-to-cog condition is fulfilled. The criterion may for example be that a cog-to-cog condition is present, or that there is a risk for a cog-to-cog condition, which cannot be solved sufficiently fast without taking an active measure. The method comprises a step, S110, of, when the input shaft is rotating, controlling the synchromesh arrangement so as to induce and/or increase a difference in rotational speed between the first gear wheel and the first coupling sleeve by at least partly engaging the first gear wheel or the second gear wheel to the input shaft. The method may further, after step S110, comprise a step, S115, of checking whether a cog-to-cog condition is present between the first gear wheel and the first coupling sleeve. If not, the method may be terminated. If step S115 reveals that a cog-to-cog condition is prevailing, the method may comprise a step, S120, of increasing the difference in rotational speed between the first gear wheel and the first coupling sleeve. This may be achieved by increasing the rotational speed of the input shaft. Alternatively, this may be achieved by controlling an actuator of the synchromesh arrangement to achieve another degree of engagement of frictional surfaces of the synchromesh arrangement, i.e. a different frictional force in the synchromesh arrangement.

In case the rotational speed of the input shaft should be too high to enable a desired difference in rotational speed between the first gear and the first coupling sleeve, the method may further comprise a step of reducing the rotational speed of the input shaft. This may for example be achieved by means of a transmission brake, an electrical motor or by means of the clutch, or any other previously known method therefore. Such a step of reducing the rotational speed of the input shaft may be performed prior to, or after, step S110 described above.

In the following, the method according to the present disclosure for controlling a vehicle powertrain to overcome, or avoid, a cog-to-cog condition during gear shifting will be exemplified with reference to the powertrain 3 illustrated in FIG. 2. For ease of explanation, the method will be exemplified based on an initial condition wherein the vehicle is at standstill, and the main shaft 30 therefore is in a non-rotating state. However, the examples below apply in a corresponding manner during a gear shift even if the vehicle is not at standstill and the main shaft therefore is rotating at the initiation of the method. Furthermore, the examples below assume that the synchromesh arrangement comprises the coupling sleeve 18. In the examples below, gear wheel 14A/14A' is denominated 14A when it represents the first gear wheel and is denominated 14A' when it represents the second gear wheel in the method disclosed herein.

According to a first example, a situation is considered where the main shaft 30 is not rotating as a result of the vehicle being at standstill, and the gear wheel to be engaged to the main shaft 30 constitutes the gear wheel 12A. The gear wheel 12A thus represents the "first gear wheel" and the coupling sleeve 16 represents the "first coupling sleeve" according to the method disclosed herein. When the input shaft 10 is rotating, the synchromesh arrangement is controlled such as to at least partly engage gear wheel 14A' to the input shaft 10. The gear wheel 14A' is here functioning as the "second gear wheel" according to the method. As a result of the at least partial engagement of the gear wheel 14A' to the input shaft through the synchromesh arrangement while the input shaft is rotating, the gear wheel 14B will start to rotate which in turn causes the lay shaft 20 to rotate. As a result of the lay shaft 20 rotating, a rotational movement of the gear wheel 12A will be induced. Since the coupling sleeve 16 is not rotating as a result of the main shaft 30 being at standstill, a difference in rotational speed between the "first gear wheel", i.e. gear wheel 12A, and the "first coupling sleeve", i.e. the coupling sleeve 16, is thereby induced. By means of such a difference in rotational speed, a cog-to-cog condition may be avoided, or if already present, be overcome.

According to a second example, the gear wheel to be engaged to the main shaft 30 constitutes the gear wheel 13A. In the method disclosed herein, the gear wheel 13A thus represents the "first gear wheel" and the coupling sleeve 17 represents the "first coupling sleeve" according to this second example. In the same manner as described in the first example above, the synchromesh arrangement is controlled such as to at least partly engage gear wheel 14A' to the input shaft 10 when the input shaft is rotating. Thereby, the lay shaft 20 will start to rotate, which in turn causes a rotation of the "first gear wheel", here gear wheel 13A. Thereby, a difference in rotational speed between the "first gear wheel" and the "first coupling sleeve", here coupling sleeve 17, has been induced. By means of such a difference in rotational speed, a cog-to-cog condition may be avoided, or if already present, be overcome.

According to a third example, the gear wheel to be engaged to the main shaft constitutes the gear wheel 14A and the gear shift to be performed is intended to be to a gear ratio 1:1 through the gearbox units 4A and 4B. Such a gear ratio is achieved when the input shaft 10 is directly connected to the main shaft 30. According to this third example, the "first gear wheel" is represented by gear wheel 14A and the "first coupling sleeve" is represented by coupling sleeve 17. When the input shaft is rotating, the synchromesh arrangement is controlled so as to at least partly engage the "first gear wheel", here gear wheel 14A, to the input shaft 10. The gear wheel 14A will thereby start to rotate and a difference in rotational speed between the "first gear wheel" (i.e. gear wheel 14A) and the "first coupling sleeve", here coupling sleeve 17, will thereby be induced. By means of such a difference in rotational speed, a cog-to-cog condition may be avoided, or if already present, be overcome. When the coupling sleeve 17 then successfully engages the first gear wheel 14A, the input shaft 10 will be directly connected to the main shaft 30.

According to a fourth example, the gear wheel to be engaged to the main shaft constitutes the gear wheel 14A. Thus, here the "first gear wheel" is represented by gear wheel 14A and the "first coupling sleeve" is represented by coupling sleeve 17. According to this fourth example, the synchromesh arrangement is associated with gear wheel 15A. When the input shaft 10 is rotating, the synchromesh arrangement is controlled so as to engage a "second gear wheel", here gear wheel 15A, to the input shaft 10 by means of the coupling sleeve 18. Thereby, the lay shaft 20 will start to rotate, which in turn causes the gear wheel 14A to rotate. Thereby, a difference in rotational speed between the gear wheel 14A and the coupling sleeve 17 will be induced. By means of such a difference in rotational speed, a cog-to-cog condition may be avoided, or if already present, be overcome.

Naturally, gear wheels 12A and 13A may be selected as the "first gear wheel" according to the fourth example above in the same way as gear wheel 14A. The "first coupling sleeve" will in such cases naturally be the corresponding coupling sleeve configured to engage such a "first gear wheel".

Figure 5:
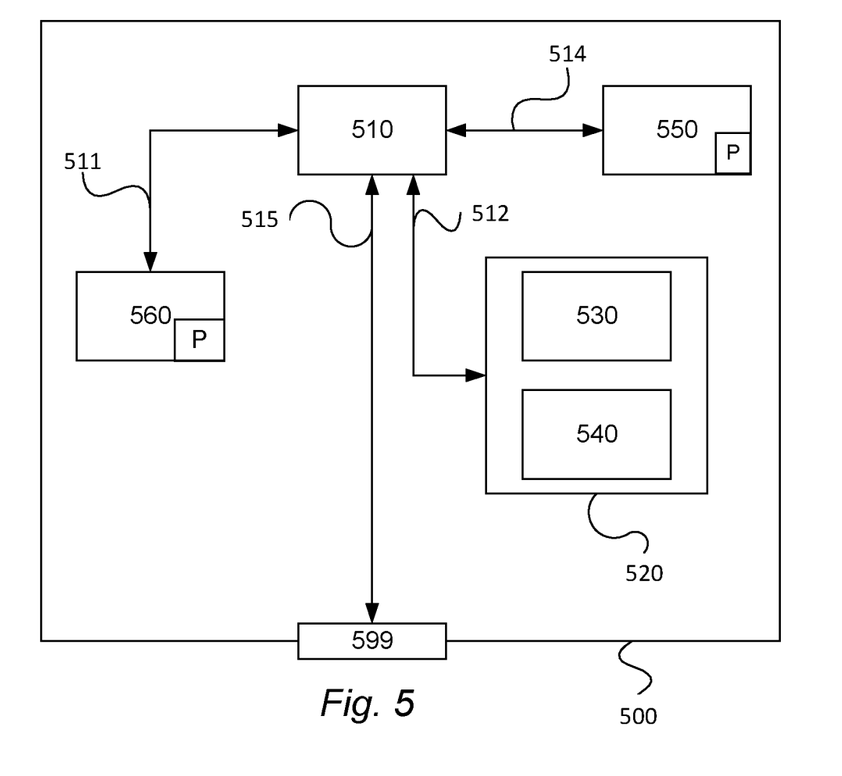
FIG. 5 schematically illustrates a device that may constitute, comprise or be a part of a control device configured to control a vehicle powertrain.

FIG. 5 schematically illustrates an exemplifying embodiment of a device 500. The control device 100 described above may for example comprise the device 500, consist of the device 500, or be comprised in the device 500.

The device 500, shown in the figure, comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises routines for controlling a vehicle powertrain to overcome, or avoid, a cog-to-cog condition during gear shifting. The powertrain comprises a propulsion unit and a gearbox. The gearbox comprises an input shaft, a lay shaft connected to the input shaft, and a main shaft connected to the lay shaft. The gearbox further comprises a first gear wheel configured to be engaged to the main shaft by a first coupling sleeve. The first coupling sleeve is axially movable and rotatably fixed to the main shaft. The gearbox further comprises a synchromesh arrangement comprising a second coupling sleeve. The synchromesh arrangement is configured to engage the first gear wheel and/or a second gear wheel to the input shaft. The computer program comprises routines for controlling the synchromesh arrangement so as to induce and/or increase a difference in rotational speed between the first gear wheel and the first coupling sleeve by at least partly engaging the first gear wheel or the second gear wheel to the input shaft. The computer program may further comprise routines for controlling the rotational speed of the input shaft to achieve a desired amount of difference in rotational speed between the first gear wheel and the first coupling sleeve. The computer program may alternatively comprise routines for controlling an actuator of the synchromesh arrangement to achieve a desired frictional force in the synchromesh arrangement, thereby in turn obtaining the desired amount of difference in rotational speed between the first gear wheel and the first coupling sleeve.

The program P may be stored in an executable form or in a compressed form in a memory 560 and/or in a read/write memory 550.

The data processing unit 510 may perform certain functions. For example, the data processing unit 510 may effect a certain part of the program stored in the memory 560 or a certain part of the program stored in the read/write memory 550.

The data processing device 510 can communicate with a data port 599 via a data bus 515. The non-volatile memory 520 may be intended for communication with the data processing unit 510 via a data bus 512. The separate memory 560 may be intended to communicate with the data processing unit 510 via a data bus 511. The read/write memory 550 may be adapted to communicate with the data processing unit 510 via a data bus 514.

When data are received on the data port 599, they may be stored temporarily in the second memory element 540. When input data received have been temporarily stored, the data processing unit 510 may be prepared to effect code execution according to a computer program comprising program code for causing a control device to perform the method (or parts thereof) for controlling a braking system for a vehicle as described herein.

Parts of the methods herein described may be effected by the device 500 by means of the data processing unit 510 which runs the program stored in the memory 560 or the read/write memory 550. When the device 500 runs the program, methods herein described are executed.

The invention claimed is:

1. A method for controlling a vehicle powertrain to overcome, or avoid, a cog-to-cog condition during gear shifting, the method performed by a control device,
the powertrain comprising:
a propulsion unit; and
a gearbox comprising:
an input shaft;
a lay shaft connected to the input shaft;
a main shaft connected to the lay shaft;
a first gear wheel configured to be engaged to the main shaft by a first coupling sleeve, the first coupling sleeve being axially movable and rotatably fixed to the main shaft; and
a synchromesh arrangement comprising a second coupling sleeve and configured to engage the first gear wheel and/or a second gear wheel to the input shaft,
wherein the method comprising:
while the input shaft is rotating, controlling the synchromesh arrangement so as to induce and/or increase a difference in rotational speed between the first gear wheel and the first coupling sleeve by at least partly engaging the first gear wheel or the second gear wheel to the input shaft, wherein controlling the synchromesh arrangement comprises controlling an actuator of the synchromesh arrangement so as to achieve a desired frictional force in the synchromesh arrangement, thereby in turn obtaining a desired amount of difference in rotational speed between the first gear wheel and the first coupling sleeve.

2. The method according to claim 1, further comprising controlling the rotational speed of the input shaft to achieve a desired amount of difference in rotational speed between the first gear wheel and the first coupling sleeve.

3. The method according to claim 1, wherein, at initiation of the method, the main shaft is in a non-rotating state.

4. The method according to claim 1, further comprising detecting a cog-to-cog condition between the first gear wheel and the first coupling sleeve.

5. The method according to claim 1, wherein the powertrain further comprises a clutch arranged between the propulsion unit and the gearbox, wherein said controlling the synchromesh arrangement further comprises while the clutch is engaged and the input shaft is rotating, controlling the synchromesh arrangement so as to induce and/or increase a difference in rotational speed between the first gear wheel and the first coupling sleeve by at least partly engaging the first gear wheel or the second gear wheel to the input shaft.

6. A computer program comprising computer program code stored on a non-transitory computer-readable medium, said computer program product used for controlling a vehicle powertrain to overcome, or avoid, a cog-to-cog condition during gear shifting, the method performed by a control device, the powertrain comprising: a propulsion unit; and a gearbox comprising: an input shaft; a lay shaft connected to the input shaft; a main shaft connected to the lay shaft; a first gear wheel configured to be engaged to the main shaft by a first coupling sleeve, the first coupling sleeve being axially movable and rotatably fixed to the main shaft; and a synchromesh arrangement comprising a second coupling sleeve and configured to engage the first gear wheel and/or a second gear wheel to the input shaft, said computer program code comprising computer instructions to cause one or more control devices to perform the following operations:

while the input shaft is rotating, controlling the synchromesh arrangement so as to induce and/or increase a difference in rotational speed between the first gear wheel and the first coupling sleeve by at least partly engaging the first gear wheel or the second gear wheel to the input shaft, wherein controlling the synchromesh arrangement comprises controlling an actuator of the synchromesh arrangement so as to achieve a desired frictional force in the synchromesh arrangement, thereby in turn obtaining a desired amount of difference in rotational speed between the first gear wheel and the first coupling sleeve.

7. The computer program according to claim 6, wherein the powertrain further comprises a clutch arranged between the propulsion unit and the gearbox, wherein said controlling the synchromesh arrangement further comprises while the clutch is engaged and the input shaft is rotating, controlling the synchromesh arrangement so as to induce and/or increase a difference in rotational speed between the first gear wheel and the first coupling sleeve by at least partly engaging the first gear wheel or the second gear wheel to the input shaft.

8. A control device configured to control a vehicle powertrain to overcome, or avoid, a cog-to-cog condition during gear shifting,
the powertrain comprising:
  a propulsion unit; and
  a gearbox comprising:
    an input shaft;
    a lay shaft connected to the input shaft;
    a main shaft connected to the lay shaft;
    a first gear wheel configured to be engaged to the main shaft by a first coupling sleeve, the first coupling sleeve being axially movable and rotatably fixed to the main shaft; and
    a synchromesh arrangement comprising a second coupling sleeve and configured to engage the first gear wheel and/or a second gear wheel to the input shaft,
wherein the control device is configured to, while the clutch is engaged and the input shaft is rotating, control the synchromesh arrangement so as to induce and/or increase a difference in rotational speed between the first gear wheel and the first coupling sleeve by at least partly engaging the first gear wheel or the second gear wheel to the input shaft, wherein controlling the synchromesh arrangement comprises controlling an actuator of the synchromesh arrangement so as to achieve a desired frictional force in the synchromesh arrangement, thereby in turn obtaining a desired amount of difference in rotational speed between the first gear wheel and the first coupling sleeve.

9. The control device according to claim 8, further configured to control the rotational speed of the input shaft to achieve a desired amount of difference in rotational speed between the first gear wheel and the first coupling sleeve.

10. The control device according to claim 8, configured to perform the step of controlling the synchromesh arrangement so as to induce and/or increase a difference in rotational speed between the first gear wheel and the first coupling sleeve when the main shaft is in a non-rotating state.

11. The control device according to claim 8, further configured to determine a cog-to-cog condition between the first gear wheel and the first coupling sleeve, and to perform the step of controlling the synchromesh arrangement so as to induce and/or increase a difference in rotational speed between the first gear wheel and the first coupling sleeve if a cog-to-cog condition has been determined.

12. The control device according to claim 8, wherein said control device is an electronic processor configured to operate on instructions in software code to perform at least the operations of claim 8.

13. The control device according to claim 8, wherein the powertrain further comprises a clutch arranged between the propulsion unit and the gearbox, wherein said controlling the synchromesh arrangement further comprises while the clutch is engaged and the input shaft is rotating, controlling the synchromesh arrangement so as to induce and/or increase a difference in rotational speed between the first gear wheel and the first coupling sleeve by at least partly engaging the first gear wheel or the second gear wheel to the input shaft.

14. A vehicle comprising:
a powertrain comprising:
  a propulsion unit; and
  a gearbox comprising:
    an input shaft;
    a lay shaft connected to the input shaft;
    a main shaft connected to the lay shaft;
    a first gear wheel configured to be engaged to the main shaft by a first coupling sleeve, the first coupling sleeve being axially movable and rotatably fixed to the main shaft; and
    a synchromesh arrangement comprising a second coupling sleeve and configured to engage the first gear wheel and/or a second gear wheel to the input shaft; and
a control device configured to control the powertrain to overcome, or avoid, a cog-to-cog condition during gear shifting, said control device configured to, while the input shaft is rotating, control the synchromesh arrangement so as to induce and/or increase a difference in rotational speed between the first gear wheel and the first coupling sleeve by at least partly engaging the first gear wheel or the second gear wheel to the input shaft, wherein controlling the synchromesh arrangement comprises controlling an actuator of the synchromesh arrangement so as to achieve a desired frictional force in the synchromesh arrangement, thereby in turn obtaining a desired amount of difference in rotational speed between the first gear wheel and the first coupling sleeve.

15. The vehicle according to claim 14, wherein the powertrain further comprises a clutch arranged between the propulsion unit and the gearbox, wherein said controlling the synchromesh arrangement further comprises while the clutch is engaged and the input shaft is rotating, controlling the synchromesh arrangement so as to induce and/or increase a difference in rotational speed between the first gear wheel and the first coupling sleeve by at least partly engaging the first gear wheel or the second gear wheel to the input shaft.

* * * * *

UNITED STATES PATENT AND TRADEMARK OFFICE
CERTIFICATE OF CORRECTION

PATENT NO. : 11,840,237 B2
APPLICATION NO. : 17/610358
DATED : December 12, 2023
INVENTOR(S) : Jonas Lindström It is certified that error appears in the above-identified patent and that said Letters Patent is hereby corrected as shown below:

In the Claims

In Column 15, Claim 8, Line 41, "clutch is engaged and the" should be removed

Signed and Sealed this
Fourth Day of June, 2024

*Katherine Kelly Vidal*
Katherine Kelly Vidal
*Director of the United States Patent and Trademark Office*